United States Patent
Eggen

(10) Patent No.: US 6,246,984 B1
(45) Date of Patent: Jun. 12, 2001

(54) DEVICE HAVING FUNCTIONALITY MEANS SUPPORTED BY ANCILLARY MESSAGE REPRODUCTION MEANS

(75) Inventor: Josephus H. Eggen, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/430,090

(22) Filed: Apr. 25, 1995

Related U.S. Application Data

(63) Continuation of application No. 07/919,006, filed on Jul. 23, 1992.

(30) Foreign Application Priority Data

Aug. 29, 1991 (EP) .................................................. 91202190

(51) Int. Cl.[7] .................................................. G01L 21/04
(52) U.S. Cl. .................................................. 704/270
(58) Field of Search .................................. 395/2.79, 2.81, 395/2.89; 381/43

(56) References Cited

U.S. PATENT DOCUMENTS

| | | | |
|---|---|---|---|
| 4,016,540 | * | 4/1977 | Hyatt .................................. 395/2.79 |
| 4,497,032 | * | 1/1985 | Shinohara ........................... 395/2.79 |
| 4,617,661 | * | 10/1986 | Futaki et al. ........................ 395/2.79 |

FOREIGN PATENT DOCUMENTS

| | | |
|---|---|---|
| 0402911 | 6/1990 | (EP) . |
| 9102433 | 2/1991 | (WO) . |

OTHER PUBLICATIONS

Research Disclosure, No. 263, Mar. 1986, Havant, GB, pp. 115, "Audio Help For Computer Users".

* cited by examiner

*Primary Examiner*—William R. Korzuch
*Assistant Examiner*—Susan Wieland
(74) *Attorney, Agent, or Firm*—Steven R. Biren

(57) ABSTRACT

A device is provided, which, ancillary to functionality means (used in normal operation) comprises message reproduction means. The message reproduction means as they are used for example in providing on line help information or in rendering annotations to visually displayed information render in speech form a message which elaborates an aspect current in the functionality means. In order to reduce the time needed to locate a desired passage in the message, the device allows the user selectively to activate the message reproduction means for rendering said message in speech form at least either according to a first standard velocity or to a second, time saving velocity.

5 Claims, 1 Drawing Sheet

DEVICE HAVING FUNCTIONALITY MEANS SUPPORTED BY ANCILLARY MESSAGE REPRODUCTION MEANS

This is a continuation of application Ser. No. 07/919,006, filed on Jul. 23, 1992.

BACKGROUND OF THE INVENTION

The invention relates to a device having user interface means, coupled for communication both
- with functionality means for executing a main function of the device, and
- with message reproducing means which are ancillary to the functionality means and activatable via said user interface means, for reproducing an optional message providing an elaboration upon an aspect current in said functionality means.

An example of such a device is a device with an on line help facility, another example is a device for multimedia file reproduction. In such devices, the message reproducing means provide a supporting function: they assist the user in using the main function of the device, which is performed by the functionality means. The message reproduction means provide for example for the reproduction of annotations to a document being displayed, or of on line help messages. Devices with an on line help facility ancillary to functionality means include for example a computer, a videorecorder, a cd-player, a remote control unit to a consumer apparatus etcetera.

In the devices to which the invention relates, the message reproducing means are ancillary and provide optional elaboration of an aspect current in the functionality means. In the context of the present application this has the technical meaning that the functionality means are independent of the message reproducing means; in particular, the message reproducing means are arranged for reproducing messages that will not be reproduced during normal operation of the functionality means, and they are ready to respond to activation simultaneously (at least effectively so for the purposes of the user) as the functionality means are active, or at least activatable. Normal communication with the functionality means and their operation does not necessarily require the activation of the message reproduction means.

It is advantageous to use audible —i.e. speech— form for reproducing the message, as this leaves the users' eyes free, for example to look at buttons for communication with the functionality means as the help information mentions them.

Because, in the device to which the invention relates, the message has only an assisting nature, it should occupy as little as possible of the users time. Due to their inherently sequential nature, devices which provide for spoken messages of an ancillary nature have had heretofore only limited use in the art, because they have the disadvantage that the messages must either be short, containing little information or long, containing, for example, a long explanation or several independent items. In the latter case, before reaching the required item, the user often has to waste time in listening to a part of the spoken message which contains information which is already known, or which is not relevant at the particular moment that the spoken message is reproduced.

SUMMARY OF THE INVENTION

Amongst others, it is an object of the invention to provide for a system which gives the user a control facility to search with increased speed for desired information within the message.

According to the invention, this object is realized because the device is characterized, in that said message reproduction means are selectively activatable via said human interface means for rendering said message in speech form at least either according to a first standard velocity or to a second, time saving velocity, respectively. The user is thus given control over the velocity of reproduction of the message.

The velocity is adjustable at least to two different values: normal and time saving (fast), but more levels of adjustment may be provided, or adjustment may be continuous.

By providing for modification to a time saving velocity which is a substantial factor, e.g. more than 20 percent, faster than the normal velocity the search process can be speeded up by the user. If the range of velocity adjustment is moreover made to encompass decreased velocities, this will also allow the user to adjust the velocity for optimal understanding of critical passages; in fact this may also be useful in itself, that is, even without control of increased velocities.

An embodiment of the device according to the invention is characterized, in that said message provides help information about control communication to the functionality means, the user interface means comprising message selection means, for selecting the message from a plurality of messages on the basis of a received identification of a control communication command. In this way desired passages in spoken help information about control commands are made more rapidly accessible. Such help functions are particularly useful for stand alone household appliances.

A further embodiment of the device according to the invention is characterized, in that it comprises retrieving means for retrieving said message from a multimedia file, the retrieving means being controlled by pointing means, for receiving a location pointed at in a visual display part of said multimedia file. Thus, access to specific passages in annotations associated with locations in visual documents is sped up.

A further embodiment of the device according to the invention is characterized, in that the user interface means comprise control means, for switching between said first and second velocities during reproduction of said speech output. This enables the user to adapt the reproduction velocity to his or her needs. Desired passages can be reproduced at normal velocity for improved understanding.

There exist a great many possibilities to adjust the velocity of speech reproduction of the text message. An advantageous embodiment of the device according to the invention is characterized, in that the message reproducing means are arranged for, during rendering at said time saving velocity, skipping reproduction of parts of the message.

A further embodiment of the device according to the invention is characterized, in that the message reproducing means are arranged for retrieving a mark point stored to identify a location marking the end of one of said parts in the message and for, after said skipping, resuming reproduction at said mark point. By resuming reproduction at a specific mark point skipping is made selective, ensuring reproduction of a word useful for locating a passage. In the device, the mark point or, if needed a plurality of mark points, is stored in association with the message, and it identifies for example the location of a headword of a paragraph or another keyword in the message. The device may provide for further mark points to identify the start of skipping, but this may also be left under control of the user.

In a preferred embodiment of the device or reproduction system according to the invention, the message reproducing means are arranged for continuous reproduction of the message in speech form at normal and/or time saving velocity. This will make it easier to locate a desired passage during search. Continuous speech reproduction of the text message at an increased rate can be realized for example in sampled speech, simply by reproducing in increased number of samples per unit time.

In another embodiment of the device or reproduction system according to the invention, the message reproducing means are arranged for keeping a pitch period of the message in speech form independent of velocity. This makes it even easier to locate a desired passage during search at modified velocity, and when the reproduction is slowed down from its normal velocity, the understandability is also good. The pitch of the text message in speech form can for example be kept unchanged when a speech synthesizer with modifiable speech rate is used. Alternatively, a speech compression/expansion technique, like the Pitch Synchronous Overlap and Add technique, known per se from European patent application number 0363233, incorporated herein by way of reference, may be used; as this technique is applicable to recorded spoken utterances, its use has the advantage that a user can easily add help information to the system by recording new messages.

BRIEF DESCRIPTION OF THE DRAWINGS

The system according to the invention will be illustrated using the following figures, of which

DETAILED DESCRIPTION OF THE PREFERRED EMBODIMENTS

Figure 1:
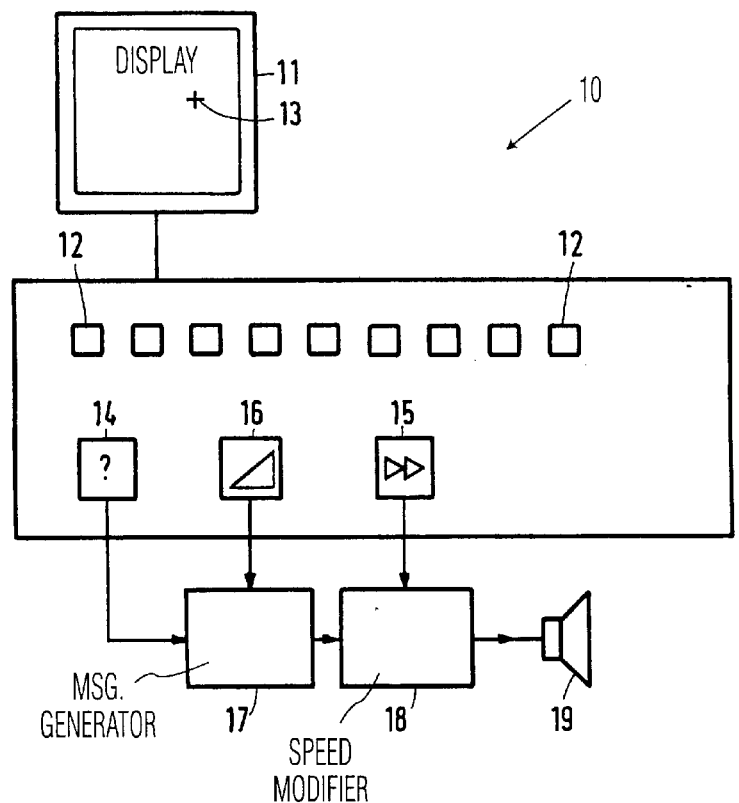
FIG. 1 shows a system according to the invention with help means and velocity modification means for the help means

FIG. 1 shows a system 10, with a plurality of control organs 12, with which functions of the system can be activated. As an example, the system may be a computer, in which the control organs 10 are keys on a keyboard.

Modern systems 10 often have so many possible functions that it is necessary to provide a help key 14, which serves to evoke information on how to activate a function with the control organs. Thus, the device provides for example for on line help about the use of functions; this is increasingly important as the functions become more complicated and greater in number. On line help furnishes help information, explaining to the user how a function can be activated and what it does. For example, in a computer many functions can be actuated by typing in commands on keyboard keys. Such commands moreover often have parameters that may be given a great many meaningful values. When such a computer is used, help information, provoked for example by typing in part of the command in combination with a help command, will help the user to select a desired command or to determine the appropriate parameters. Similar help can be provided for (remote) control units for consumer apparatuses, like videorecorders, cd-players etcetera.

Typically, the user has to activate the help key and type some kind of function identification, the latter being for example the name of a command for a computer, or a specific key about which help information is required. In the system according to the invention, when the help key is thus activated, this will trigger message reproducing means 17, 18, which comprise for example a speech synthesizer or recorded speech information, to retrieve a text message containing the desired help information and to reproduce the text message in speech form via a loudspeaker 19.

It has been found that the designer of help information is faced with a trade-off for the length of the text message. For rapid access to information from text messages in speech form, due to their sequential nature, it is essential that the message be short. Fortunately, although the system may have a large body of help information, spoken help messages can be kept relatively short because only a selected small fraction of the body of help information, as appropriate for the help query, is reproduced. However, since it is not always possible to know in advance which help information will be required, it is unavoidable to include more information in the text message than a user needs at a specific time. For example, in help information on how to store a file in a computer system, there may be information items about the command itself, about allowable filenames, about the selection of a device for storing, about file directories, about setting of read/write protection scopes, expiration dates, etcetera. Usually, the user will require only one such item, often without precisely knowing its name or position among other items. Hence, the user will be forced to listen to all items in order to find a desired item.

This will lead to wasted time, as the user listens to undesired items. In order to reduce this wasted time, the invention provides for a speed control actuator 15, controlling speed with which the message reproducing means render the message.

In one embodiment the speed chage is effect by speed modification means 18, with which the speed of reproduction can be modified by the user during reproduction. This allows the user to speed up the text message in speech form during undesired items and to slow it down at desired items.

In another embodiment, at least two versions of the message, one corresponding to normal speed, the other to time saving speed, are stored in the message reproducing means, and the speed control actuator selects which of the two is reproduced; when switching between the two versions, reproduction is resumed at corresponding locations in the message.

In this way, apart from known control organs, like a help key 14 and a volume control 16, a further, speed actuator 15 is added. (Or at least a further actuator function: the help key may also serve as a normal/fast speed toggling key during reproduction, since during text reproduction usually no further help actuation is expected).

A similar extra actuator will be useful in multimedia systems. A multimedia system provides for passing information via several human senses combined, mostly via images and sound. Special multimedia "files" or "documents" are presented to the system and reproduced via a display screen 11 and a loudspeaker 19. One example of such a document comprises a mixture of visual text and spoken annotations, wherein the visual text in itself provides coherent information, and the spoken annotations provide optionally selectable background to items located in the text. In another example, the text message is associated with a location in an image like for example a drawing. In both cases the user will be able to select reproduction of the text message from the visual display 11 of the document by indicating the location 13 associated with the text message. Indication may for example be effected using a mouse, which controls a cursor location 13 on the screen 11, indication being effected by pressing a select button when the cursor is at the desired location, or as another example, by using a touch screen 11 which makes it possible to determine a location where the screen 11 is touched, or as yet another alternative by using buttons arranged next to the location but outside the screen. Upon indication the multimedia system consults a linking item from the multimedia file to identify the text message which is linked to the location 13 and reproduces it.

When there are several text messages indication of items can be used to select a single one, but inside one message the user who needs only a part of this text message in speech form is enabled to reduce the time lost in searching for that part by the provision of a speed control actuator 15 in the system 11.

In order to improve the intelligibility (that is, the extent to which sounds are identifiable, independent of whether their meaning is understandable) of desired passages of spoken text, the speech modification means 18 are preferably arranged to retain continuous speech at increased or decreased speed; also to improve intelligibility, it is preferred that the speed modification is such that the pitch of the text message in speech form is not altered by speed changes. A technique to achieve this is known for example from the European patent application no 0363233. As the technique used there in itself is not the subject of the present application, it will be discussed only briefly (reference is had to the abovementioned publication for further details about its implementation): the text message in speech form is synthesized by first dissassembling the signal into a series of segments, each containing two pitch periods of speech from a prototype text message in speech form, successive segments being exctracted from intervals overlapping each other over half their extent. The speech signal is then resynthesized by replaying the segments, slipping some of the segments at a regular rate to reduce the duration. It has been found that this technique retains the intelligibility of speech even if the reproduction speed is modified by more than a factor of three; this makes it very suitable for speed modification during search in text messages in speech form. Moreover, it allows for speed modification of arbitrary text messages, even those added to the system by users.

Alternatively, the time saving speed may be achieved by skipping parts of the message during reproduction. The start points of the parts to be skipped may be selected automatically by the message reproduction means; for this purpose the message reproduction means may store mark points, marling the beginning of passages in the message which contain information which is less relevant for the purpose of locating a desired passage; alternatively the start points may be selected at periodic distances or in response to user actuations. The end points of the parts skipped, on the other hand, should preferably be located just before words usefull in locating specific passages in the message. Such words are, for example, headwords of paragraphs or keywords in the message. In order to provide for such selective skipping, mark points pointing at the locations in the message where such words occur will be stored in combination with the message. During reproduction at time saving speed, the speech reproducing means will retrieve these mark points, and resume reproduction of the message at the locations they point at.

Figure 2:
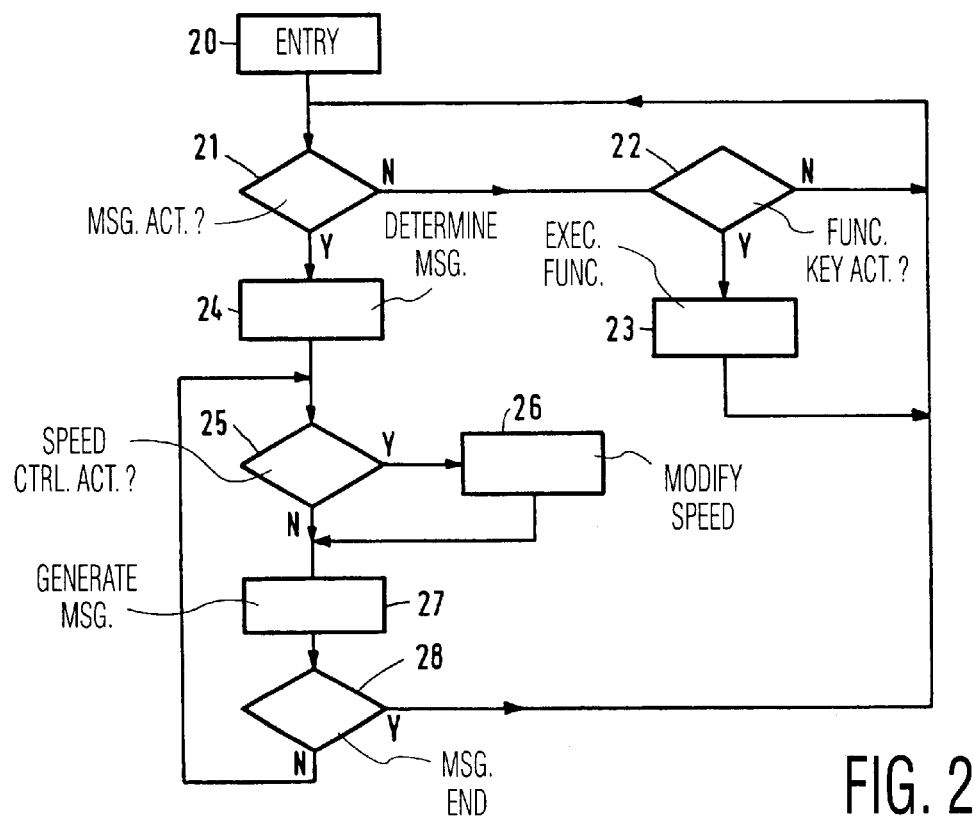
FIG. 2 shows a flow chart for implementing the system according to the invention using a computer

FIG. 2 shows a flow chart for implementing a system according to the invention, in which the actuators are polled by a computer. As the system is switched on or reset, execution starts at the entry point 20. From there, the system goes to a first step 21 where it is tested whether a message reproduction actuator is actuated. If the answer is "no", in a function execution system, it is subsequently tested 22 whether a function key is actuated, if the answer to the latter is "yes", the function is executed, and the flow chart returns to the first step 21, if the answer is "no", and in multimedia systems, the flow chart returns to the first step 21 right away.

When the answer to the test 21 whether the reproduction actuator is actuated is answered "yes", the flow chart goes on to a step 24 to determine which text message is desired (for example by testing whether some function key is also actuated, or by determining which location in or near a displayed image is indicated), to fetch the text message, and to set a reproduction speed and reproduction pointer in the message. From there, the flow chart goes to a step 25 where it is tested whether the speed control actuator is actuated, if the answer is "yes", the reproduction speed is modified 26 up or down as determined from the speed control actuator. After that, or if the speed control actuator is not actuated immediately, the part of the text message pointed at by the reproduction pointer is reproduced at the reproduction speed set and the reproduction pointer is incremented. After that, it is tested 28 whether the end of the text message is reached; if the answer is "yes", the flow chart returns to the first step 21, if "no", the flow chart returns to the step 25 where the speed control actuator is tested for actuation.

What is claimed is:

1. In a device comprising:
  (a) functionality means for executing a main function of the device,
  (b) help means ancillary to the functionality means for assisting the user in operation the functionality means, said help means including:
    (i) a plurality of non-speech-form help messages including messages relevant to the operation of the functionality means,
    (ii) message selection means,
    (iii) message reproducing means for converting any of said messages into speech form,
  (c) user interface means connected to the functionality means and the help means and responsive to a user command for obtaining help in speech form in connection with operation of an aspect of said functionality means for selecting from said plurality of messages a help message relevant to said aspect, said user interface means comprising control means for switching between said first and second velocities during reproduction of said selected help message;
  the improvement comprising:
  (d) means under user control for selectively causing the message reproducing means to render said selected help message at at least a first normal velocity or at a second faster velocity, said second velocity being faster than said first velocity to enable said user to quickly reach the part of said selected help message that may be of particular help in operating the functionality means.

2. The device as claimed in claim 1, wherein said message reproducing means comprise means for skipping reproduction of parts of said selected help message during rendering of said selected help message at said second velocity.

3. The device as claimed in claim 2, wherein said message reproducing means comprises means for retrieving a mark point stored in said messages to identify a location in said messages for resuming reproduction following skipping of part of said selected help message.

4. The device as claimed in claim 1, wherein said message reproducing means comprises means for continuous reproduction of said any of said message at a selected velocity.

5. The device as claimed in claim 1, wherein said message reproducing means comprises means for maintaining a pitch period of any of the messages in speech form independent of velocity.

* * * * *